March 8, 1966  L. W. LASSITER, JR  3,238,955

FLUID VALVE NOISE SUPPRESSOR

Filed Jan. 22, 1962

INVENTOR.
LESLIE W. LASSITER, JR.
BY
*George Sullivan*
Agent

United States Patent Office 3,238,955
Patented Mar. 8, 1966

3,238,955
FLUID VALVE NOISE SUPPRESSOR
Leslie W. Lassiter, Jr., Marietta, Ga., assignor to Lockheed Aircraft Corporation, Burbank, Calif.
Filed Jan. 22, 1962, Ser. No. 167,877
8 Claims. (Cl. 137—1)

This invention relates to a valve noise suppressor, and more particularly to a means for stabilizing the flow downstream of the aerodynamic throat of a valve to prevent the establishment of an acoustic aerodynamic resonance.

In the testing of pressurized aircraft it was found that under certain combinations of altitude and internal pressurization an intense screech, characterized as sound oscillating between one discrete frequency and another 5% to 10% different therefrom, was clearly audible in both the flight and cargo compartments. It was determined that this noise was generated in the cabin pressurization butterfly outflow valve when the valve became choked and the air was flowing through the valve in an unstable state at sonic velocity. In attempting to solve this problem consideration was given to the possibility that conventional sound proofing techniques could be used to attenuate the noise produced in the valve. This method was found unsuitable, however, because attenuation was hard to achieve using such method and for the further important reasons that it would involve costly weight and volume concessions, which are so undesirable and detrimental to efficient and economical operation of aircraft.

Accordingly, it is an object of this invention to provide a light weight valve noise suppressor.

A further object of this invention is to provide a valve with means to prevent the establishment of an acoustic-aerodynamic resonance at the throat of the valve without increasing the overall size of the valve.

A still further object of this invention is to provide a relatively simple and expedient method or way of preventing establishment of an acoustic-aerodynamic resonance in a valve throat.

Another object of this invention is to provide a butterfly valve with turbulence creating means immediately downstream of its aerodynamic throat to stabilize fluid flow, thus efficiently preventing the establishment of acoustic-aerodynamic resonance at the throat.

Figure 1:
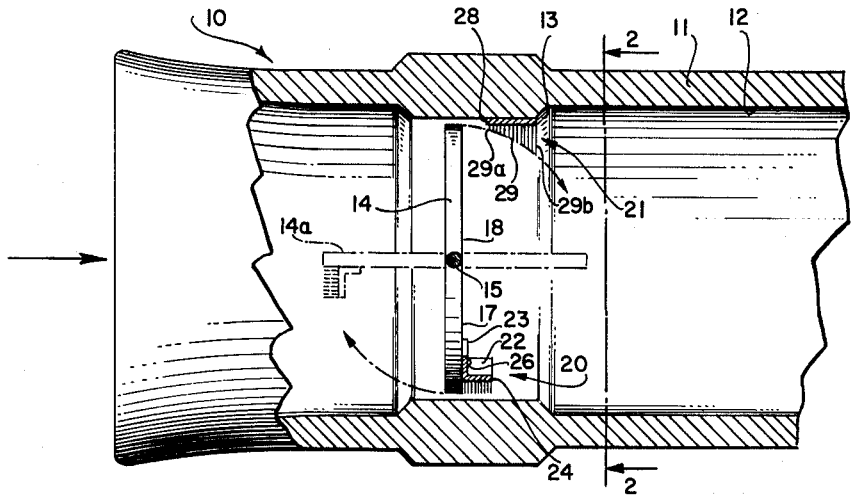
Figure 2:
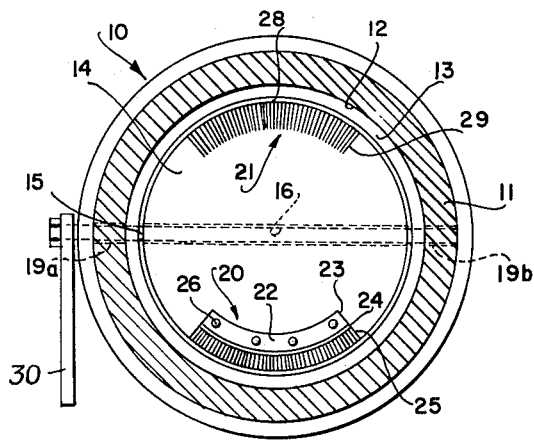

Other objects and advantages will become apparent in the following description taken in connection with the accompanying drawings in which:

FIGURE 1 is a sectional side view of a butterfly valve employing one embodiment of a noise suppressor of this invention; and FIGURE 2 is a sectional view taken along lines 2—2 of FIGURE 1.

Generally stated, the invention comprises a means for creating turbulence downstream of the throat or minimum section of a valve to prevent the generation of a sonic screech by fluid flowing through the throat of the valve.

More specifically, in FIGURES 1 and 2 there is shown a valve assembly 10 employing the noise suppressor of this invention. Valve 10 comprises a valve body 11 forming a flow passage 12 having an internal valve seating portion 13. A thin butterfly valve 14 which may be operated by the valve actuator lever 30, for example, is rotatably mounted within passage 12 at valve seat 13 on a pin 15. A diametral through bore 16 is formed in valve 14 and divides the valve into portions 17 and 18. Pin 15 is non-rotatably mounted within through bore 16 such that its opposed ends protrude from the valve. The opposed ends of the pin are rotatably mounted in opposed bores 19a and 19b, which are formed in the valve body 11.

The butterfly valve 14 in the illustrated embodiment of the invention is adapted to be rotated clockwise on pin 15 from its closed position as shown in solid line in FIGURE 1 to its fully open position 14a as shown in dotted line in FIGURE 1. The valve portion 17 may therefore be properly called a leading portion and the valve portion 18, a trailing portion. Also, the direction of fluid flow is from left to right, in the direction of the arrow, in FIGURE 1.

In accordance with this invention, the valve assembly 10 is provided with a noise suppressor comprising turbulence creating means 20 and 21. Turbulence creating means 20 comprises an arcuate angle plate 22 having perpendicularly related flanges 23 and 24. A plurality of rows of pins 25 each having the same length are connected by any suitable means to the convex outer face of flange 24. The turbulence creating means 20 is secured to the leading portion 17 of the butterfly valve 14 on its downstream side by rivets 26 or other suitable securing means. When the turbulence creating means 20 is in its emplaced position, the tip ends of the pins 25 are preferably in axial alignment with the peripheral edge of the valve 14 and arcuately extend over a portion of the peripheral edge of valve portion 17.

The turbulence creating means 21 comprises an arcuate plate 28 having a plurality of rows of pins 29 connected by suitable means to the interior concave face of the plate 28. Turbulence creating means 21 is secured by suitable means to the surface of flow passage 12 at valve seating portion 13 immediately downstream of the valve 14 such that it arcuately extends over a portion of the arcuate distance defined by the peripheral surface of the valve portion 18 and the surface of the flow passage.

The rows of pins 29 are of increasingly greater length from their interior row 29a, which is closest to the valve, to their outer row 29b, which is farthest from the valve, to permit the location of the turbulence creating means as close as possible to the closed position of the valve, yet permitting opening of the valve without interference.

A typical butterfly valve of the disclosed construction was provided with turbulence creating means 20 and 21 constructed in accordance with this invention. The turbulence creating means 20 was connected to arcuately extend over approximately 45% of the peripheral surface of valve portion 17 and the turbulence creating means 21 was connected to extend over approximately 45% of the arcuate distance defined by the valve portion 18. Tests performed on the butterfly valve, thus modified, disclosed that the turbulence creating means substantially eliminated the scream from the valve. It is to be understood that the optimum minimum length of the turbulence creating means in a given application depends primarily upon the pressure head in the fluid flow passage and the valve configuration. Also, the configuration of the turbulence creating means depends primarily upon the configuration of the valve, the only critical limitation being that the turbulence creating means be disposed immediately downstream of the valve throat to create turbulence thereat. Further, the noise suppressor is not limited for use with a butterfly valve, but may be used in other valves such as a gate valve, for example.

For purposes of operation illustration, let us first assume that a predetermined high pressure head exists upstream of the butterfly valve 14 and that the butterfly valve is not provided with the noise suppressor means of this invention. Under such condition, when the valve is cracked open, a slight amount of fluid will be permitted to flow from the upstream to downstream side of the valve through a small, two part, double crescent shaped orifice-like passage bounded on one side by the peripheral edge of the butterfly valve and on the other side by the interior wall of flow passage 12. This orifice passage, it will be appreciated, varies in size with a variation in the valve opening. It is the throat or minimum section of the valve and may properly be called the aerodynamic throat of the valve.

Under certain conditions of pressure head and valve opening, fluid will flow through the valve throat at sonic velocity. When this condition occurs, it is theorized that the fluid boundary layer at the throat becomes unstable, tending to vacillate between laminar and turbulent flow states. This instability, in turn, manifests itself as pressure disturbances, or sound. When the sound thus generated impinges upon the unstable boundary layer, a new disturbance is created, giving rise in turn to a new pressure disturbance, which is regenerative and periodic. The result of this acoustic-aerodynamic phenomenon is the emission of very intense sound from the valve. To stabilize the boundary layer at the valve throat, turbulence creating means 20 and 21 have been provided in accordance with this invention immediately downstream of the throat of the valve. The turbulence creating means increase the turbulent mixing immediately downstream of the throat, thereby stabilizing the fluid flow and efficiently precluding the occurrence of a resonant situation.

While a particular embodiment of the invention has been illustrated and described, it will be obvious to those skilled in the art that various changes and modifications may be made without departing from the invention and it is intended to cover in the appended claims all such modifications and equivalents as fall within the true spirit and scope of this invention.

What is claimed is:

1. In combination: a fluid gas valve contained within a fluid gas flow duct and having a throat of minimum section; turbulence creating means for suppressing valve noise disposed immediately downstream of said throat to stabilize fluid gas flow and thereby suppress valve noise, said turbulence creating means contained within the confine of the duct.

2. In combination: a butterfly valve; and turbulence creating means for suppressing valve noise connected to the downstream side of the portion of said valve moving in an upstream direction for opening of the valve to stabilize fluid flow and thereby suppress valve noise.

3. In combination: a flow passage, a butterfly valve mounted in said passage; and turbulence creating means for suppressing valve noise connected to the side of the passage immediately adjacent the portion of the valve moving in a downstream direction for opening of the valve, said connection to the passage side being downstream of the valve when the valve is in closed position.

4. In combination: a flow passage; a butterfly valve mounted within said passage; and valve noise suppressor means comprising turbulence creating means connected to the downstream side of the portion of said valve moving in an upstream direction upon opening of the valve, and turbulence creating means connected to the side of said passage adjacent the portion of said valve moving in a downstream direction upon opening of the valve, said connection to the passage side being downstream of said valve when the valve is in closed position.

5. In combination: a flow passage; a butterfly valve mounted within said passage; and valve noise suppressor means comprising turbulence creating means connected to the downstream peripheral edge of the portion of said valve moving in an upstream direction upon opening of the valve, and turbulence creating means connected to the side of said passage adjacent the portion of said valve moving in a downstream direction upon opening of the valve, said connection to the passage side being downstream of said valve when the valve is in closed position.

6. A noise suppressor for a butterfly valve comprising: mounting structure connected to the downstream portion of said valve moving in an upstream direction for opening of the valve, and turbulence creating means protruding from said mounting structure and arcuately extending over a portion of the arcuate distance defined by the peripheral edge of said valve.

7. A method of preventing the establishment of an acoustic-aerodynamic resonance in a valve contained in a fluid gas flow duct comprising the step of providing turbulence creating means immediately downstream of the aerodynamic throat of the valve and within the confine of the duct.

8. A method of preventing the establishment of an acoustic-aerodynamic resonance in a pivotal butterfly valve mounted in a passage comprising the steps of securing turbulence creating means to the passage downstream of the trailing portion of the valve when the valve is closed, and securing turbulence creating means to the downstream side of the leading portion of the valve.

References Cited by the Examiner

UNITED STATES PATENTS

| | | | |
|---|---|---|---|
| 871,775 | 11/1907 | Blanchard | 251—127 X |
| 982,981 | 1/1911 | Mueller | 251—120 |
| 1,131,371 | 3/1915 | Hatfield | 251—118 X |
| 2,328,736 | 9/1943 | Mock | 251—305 X |
| 2,509,238 | 5/1950 | Martin | 239—456 X |
| 2,659,388 | 11/1953 | Rand | 251—120 |
| 2,815,924 | 12/1957 | Burch | 251—305 |
| 3,070,345 | 12/1962 | Knecht | 251—305 |
| 3,153,319 | 10/1964 | Young et al. | 181—221 X |

M. CARY NELSON, *Primary Examiner.*

MILTON KAUFMAN, MARTIN P. SCHWADRON,
*Examiners.*